United States Patent
Takahashi

Patent Number: 6,044,341
Date of Patent: Mar. 28, 2000

[54] NOISE SUPPRESSION APPARATUS AND RECORDING MEDIUM RECORDING PROCESSING PROGRAM FOR PERFORMING NOISE REMOVAL FROM VOICE

[75] Inventor: Hidetaka Takahashi, Kunitachi, Japan

[73] Assignee: Olympus Optical Co., Ltd., Japan

[21] Appl. No.: 09/114,401

[22] Filed: Jul. 13, 1998

[30] Foreign Application Priority Data

| Jul. 16, 1997 | [JP] | Japan | 9-191557 |
| Jul. 16, 1997 | [JP] | Japan | 9-191558 |
| Jul. 16, 1997 | [JP] | Japan | 9-191559 |

[51] Int. Cl.$^7$ ................................. H04B 15/00
[52] U.S. Cl. ................ 704/226; 704/233; 704/227
[58] Field of Search ......................... 704/226, 233, 704/227

[56] References Cited

U.S. PATENT DOCUMENTS

| 5,706,394 | 1/1998 | Wynn | 704/233 |
| 5,757,937 | 5/1998 | Itoh et al. | 704/233 |
| 5,774,846 | 6/1998 | Morii | 704/232 |

FOREIGN PATENT DOCUMENTS 8-160994  6/1996  Japan.

Primary Examiner—David R. Hudspeth
Assistant Examiner—Daniel Abebe
Attorney, Agent, or Firm—Ostrolenk, Faber, Gerb & Soffen, LLP

[57] ABSTRACT

A noise suppression apparatus of the present invention includes a voice/non-voice discriminator for discriminating a frame signal divided into frames having a predetermined length; a Fourier transform unit for converting a frame signal into a spectrum; a noise spectrum estimation unit for estimating a noise spectrum of a frame judged as a non-voice signal; an amplitude spectrum subtractor for subtracting the product of an estimated noise spectrum and a predetermined coefficient from a spectrum obtained by the transform unit; an auditory correction noise adder for adding aa auditory correction noise spectrum to a spectrum outputted from the subtractor; and an inverse Fourier transform unit for performing inverse Fourier transform to an output of the adder. The noise suppression apparatus further includes a negative amplitude value counter for counting the number of frequency components in an output of the subtractor whose amplitude values are negative; a subtraction coefficient setting unit for gradually decreasing a subtraction coefficient unit the counted value becomes not more than a predetermined value; an inverse Fourier transform unit for performing inverse Fourier transform to an output of the counter; and a noise spectrum estimation unit for calculating spectrum information of noise in the frame signal using different spectrum information according to the current type of frame signal.

27 Claims, 14 Drawing Sheets

FIG.6
PROCESSING OBJECT SIGNAL
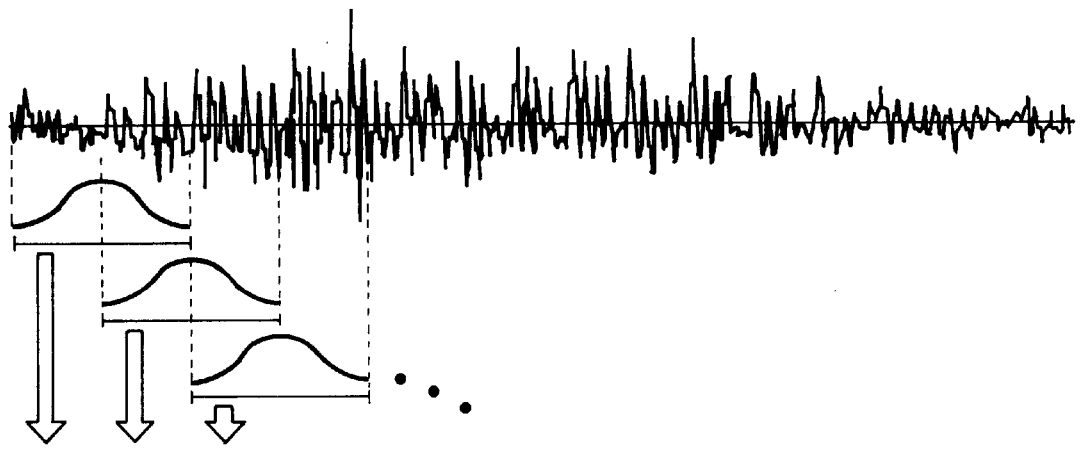
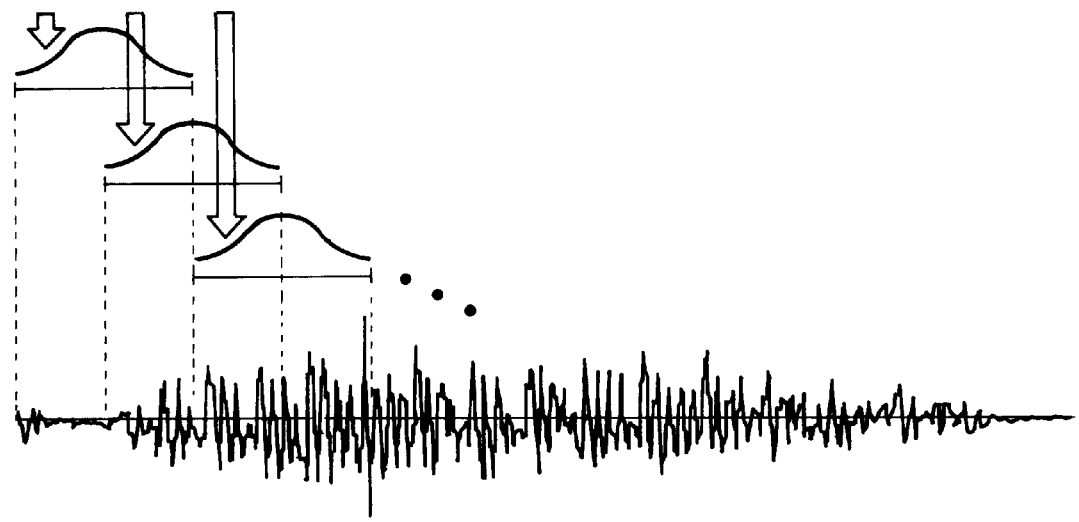
OUTPUT SIGNAL

NOISE SUPPRESSION APPARATUS AND RECORDING MEDIUM RECORDING PROCESSING PROGRAM FOR PERFORMING NOISE REMOVAL FROM VOICE

FIELD OF THE INVENTION

The present invention relates to a noise suppression apparatus reducing a noise signal included in a frame signal by performing spectrum analysis and a recording medium for recording a processing program which performs noise removal from a voice signal.

RELATED ART STATEMENT

Up to now, voice record and playback apparatuses have been proposed, the apparatuses each of which converts a voice signal obtained from a microphone or the like into a digital signal, stores it in, for example, semiconductor memory, and at the time of play back, reads this voice signal from the semiconductor memory, converts it into analog signal, and outputs it as voice from a speaker and the like.

In this type of voice record and playback apparatus, by performing highly efficient coding to a digitized voice signal in order to save the data volume recorded in semiconductor memory, it is desired to make the generated data volume as small as possible. In particular, recently, various types of sound coding technology have been developed owing to development of digital signal processing technology, and recordable time has increased dramatically.

As a means to be widely used for efficiently coding a voice signal in sound coding technology developed in this manner, there is a coding system encoding a voice signal using a linear predictive parameter expressing spectrum envelope and a sound source parameter corresponding to a linear predictive residual signal. Since comparatively high quality of synthesized sound can be obtained by a sound coding system using a linear predictive means, various types of applied systems have been studied and developed in accordance with recent progress of hardware technology. Among them, for example, multi-pulse drive LPC (Linear Predictive Coding), CELP (Code Excited Linear Predictive Coding), and the like are known as systems for obtaining good sound quality.

Sound coding technology based on linear predictive analysis as described above has an advantage of being capable of obtaining the encoding performance having high quality with a comparatively low bit rate. Nevertheless, on the other hand, it has a disadvantage of sharply degrading the sound quality if background noise and the like are mixed with the original signal.

As fields where the above-described sound coding technology is applied, mobile telephone, sound recording apparatuses, and the like are considered. It is recognized that these devices are often used under various environments including the case of mixing background noise, and hence it is essential to solve at all costs the problem of the above-described degradation of sound quality so as to realize attractive products.

Then, as preprocessing or postprocessing of such sound coding, technology which suppresses background noise superimposed over a voice signal has been enthusiastically studied and developed up to the present time. Among them, a method called spectrum subtraction is well-known as having comparatively simple construction and high effect in improving a signal-to-noise ratio (hereinafter, an S/N ratio), and is frequently used as preprocessing of a speech recognizer. One example of a noise suppression apparatus using such spectrum subtraction is the apparatus disclosed in Japanese Unexamined Patent Publication No. 8-160994.

The above-described spectrum subtraction subtracts a product of an estimated noise spectrum and a predetermined coefficient from the spectrum of an input signal. This coefficient is called a subtraction coefficient and is set at a value of one or more in many cases. The reason why this coefficient is frequently set at the value of one or more in spite of the possibility of subtracting not only the background noise but also components of voice is as follows.

In a section like a vowel section where signal energy is large, the shape of the sound spectrum is hardly affected even if a slightly large amount of spectrum is subtracted.

On the contrary, in a section like a consonant section where signal energy is small, the shape of the spectrum is large distorted. Moreover, in the section where the signal energy is small, it is fundamentally difficult to pick out only the desired sound spectrum out of the spectrum in which background noise is mixed. Hence, only an insubstantial effect is achieved even upon excessive subtraction of the spectrum.

Because of the above reasons, the subtraction coefficient is frequently set at the value of one or more, particularly in a speech recognizer.

Nevertheless, the above-described spectrum subtraction method improves data in an apparatus like a speech recognizer, but it is not designed in consideration of the human auditory sense. Hence, it is known that, although an S/N ratio is improved, sound quality at the time when listened to by a person may be not improved.

In fact, if noise suppression processing such as the spectrum subtraction method described above is simply applied as preprocessing or postprocessing in a speech recognizer, in spite of the improvement of the S/N ratio, a residual component caused by the spectrum subtraction occurs or the shape of the sound spectrum is distorted drastically. Therefore, the sound is sensed as an unnatural sound in many cases, and hence it is not uncommon for the sound quality to be rather degraded auditorily.

Moreover, although it is necessary to discriminate voice from non-voice in the spectrum subtraction, particularly in the case of only one input system, the technology has not yet been developed to completely make this discrimination, and hence the sound quality may be degraded due to the occurrence of discrimination failure.

Furthermore, in using the spectrum subtraction method, particularly in the case of only one input system, estimation of noise can be performed with relatively high precision in a non-voice section, and hence its effect is large. Nevertheless, in a voice section, since a noise component estimated in a non-voice section just before the voice section is subtracted, the noise component that is different from the background noise actually mixed in with the voice section is subtracted. Consequently, residual components thus obtained are often sensed as unnatural sounds because effects of noise suppression in a non-voice section and a voice section are large different from each other, hence the sound becomes unnatural auditorily.

Although it has been considered to adjust the subtraction coefficient described above (for example, set at a value of one or less), auditory unnaturalness is solved but the effect of noise suppression becomes small if this is executed.

SUMMARY OF THE INVENTION

A first object of the present invention is to provide a noise suppression apparatus capable of increasing auditory sound quality.

A second object of the present invention is to provide a recording medium for recording a processing program which performs noise removal from a voice signal and is capable of increasing auditory sound quality.

A third object of the present invention is to provide a noise suppression apparatus capable of improving an S/N ratio and increasing auditory sound quality.

A fourth object of the present invention is to provide a recording medium for recording a processing program which performs noise removal from a voice signal and is capable of improving the S/N ratio and increasing auditory sound quality.

A fifth object of the present invention is to provide a noise suppression apparatus capable of improving the S/N ratio and increasing auditory sound quality with simple construction.

A sixth object of the present invention is to provide a recording medium for recording a processing program which performs noise removal from a voice signal and that is capable of improving the S/N ratio and increasing auditory sound quality by simple processing.

Briefly, the present invention is a noise suppression apparatus comprising: a voice discrimination means for discriminating between a voice signal and a non-voice signal in a frame signal which is divided into frames having a predetermined length; a spectrum analysis means for converting the frame signal into a spectrum in the form of a frequency-domain signal; a noise spectrum estimation means for estimating a noise spectrum in a frame that is a non-voice signal discerned by the voice discrimination means; a spectrum subtraction means for subtracting a product by the noise spectrum estimated by the noise spectrum estimation means and a predetermined value from the spectrum obtained by the spectrum analysis means; a spectrum addition means for adding a predetermined spectrum to a spectrum that is an output signal of the spectrum subtraction means; and a time-domain signal conversion means for converting a spectrum, which is an output signal of the spectrum addition means, into a time-domain signal.

In addition, the present invention is a recording medium for recording a processing program which performs noise removal from a voice signal, the processing program making a computer execute the steps of: discriminating between a voice signal and a non-voice signal in a frame signal which is divided into frames having a predetermined length; converting the frame signal into a spectrum that is a frequency-domain signal; estimating a noise spectrum in a frame that is a non-voice signal as determined in the discriminating step; multiplying the estimated noise spectrum by a predetermined value and subtracting the multiplication result from a spectrum of the frame; adding a predetermined spectrum to a spectrum that is a subtraction output signal; and converting a spectrum, which is an addition output signal, into a time-domain signal.

Furthermore, the present invention is a noise suppression apparatus comprising: a voice discrimination means for discriminating between a voice frame signal and a non-voice frame signal in a voice signal which is divided into frames; a spectrum analysis means for analyzing spectrum components of the frame signal and outputting spectrum information; a noise spectrum estimation means for estimating spectrum information of noise in the voice signal; a spectrum subtraction means for subtracting a product of the noise spectrum estimated by the noise spectrum estimation means and a predetermined coefficient, from the spectrum information of the frame signal; an evaluation means for evaluating whether the coefficient is adequate by analyzing the spectrum information outputted from the spectrum subtraction means; a coefficient modification means for modifying the value of the coefficient on the basis of the evaluation result by the evaluation means; a control means for controlling processing so that the processing over the spectrum subtraction means, evaluation means, and coefficient modification means may be repeated until the evaluation result by the evaluation means fulfills a predetermined condition; and a time-domain signal conversion means for converting the spectrum information, which is an output of the spectrum subtraction means, into a time-domain signal.

In addition, the present invention is a recording medium for recording a processing program which performs noise removal from a voice signal, the processing program making a computer execute the steps of: discriminating between a voice frame signal and a non-voice frame signal in a voice signal which is divided into frames; analyzing spectrum components of the frame signal and outputting spectrum information; estimating spectrum information of noise in the voice signal; multiplying the estimated spectrum information of noise by a predetermined coefficient; subtracting the multiplication result from the spectrum information of the frame signal; evaluating whether the coefficient is adequate by analyzing the spectrum information of the subtraction result; modifying the value of the coefficient on the basis of the evaluation result if the evaluation result does not fulfil a predetermined condition; repeatedly executing the steps of multiplying the estimated spectrum information of noise by the predetermined coefficient, subtracting the multiplication result from the spectrum information of the frame signal, evaluating whether the coefficient is adequate by analyzing the spectrum information of the subtraction result, and modifying the value of the coefficient on the basis of the evaluation result, until the evaluation result fulfills the predetermined condition; and converting the spectrum information of the subtraction result into a time-domain signal if the evaluation result fulfills the predetermined condition.

In addition, the present invention is a noise suppression apparatus comprising: a voice discrimination means for discriminating between a voice frame signal and a non-voice frame signal in a voice signal which is divided into frames; a spectrum analysis means for analyzing spectrum components of the frame signal and outputting spectrum information; a noise spectrum estimation means for estimating spectrum information of noise in the voice signal by a calculation using the spectrum information of the frame signal and the spectrum information of the prior non-voice frame if the frame signal is a non-voice frame signal, or by a calculation using the spectrum information of a predetermined number of prior non-voice frames that are selected at random if the frame signal is a voice frame signal; a spectrum subtraction means for subtracting a product of the spectrum information of noise estimated by the noise spectrum estimation means and a predetermined value from the spectrum information of the frame signal; and a time-domain signal conversion means for converting the spectrum information which is an output of the spectrum subtraction means, into a time-domain signal.

Moreover, the present invention is a recording medium which records a processing program for performing noise removal from a voice signal, the processing program making a computer execute the steps of: discriminating between a voice frame signal and a non-voice frame signal in a voice signal which is divided into frames; analyzing spectrum components of the frame signal and outputting spectrum information; estimating spectrum information of noise in the voice signal by a calculation using the spectrum information of the frame signal and the spectrum information of the prior non-voice frame if the frame signal is a non-voice frame signal, or by a calculation using the spectrum information of a predetermined number of prior non-voice frames that are selected at random if the frame signal is a voice frame signal; subtracting a product of the estimated spectrum information of noise and a predetermined value from the spectrum information of the frame signal; and converting the spectrum information which is the result of the subtraction into a time-domain signal.

These objects and advantages of the present invention will become further apparent from the following detailed explanation.

BRIEF DESCRIPTION OF THE DRAWINGS

FIG. 6 is an explanatory drawing showing the state of performing multiplication processing of window functions in the first embodiment so that the window functions may overlap each other;

DETAILED DESCRIPTION OF THE PREFERRED EMBODIMENTS

Figure 1:
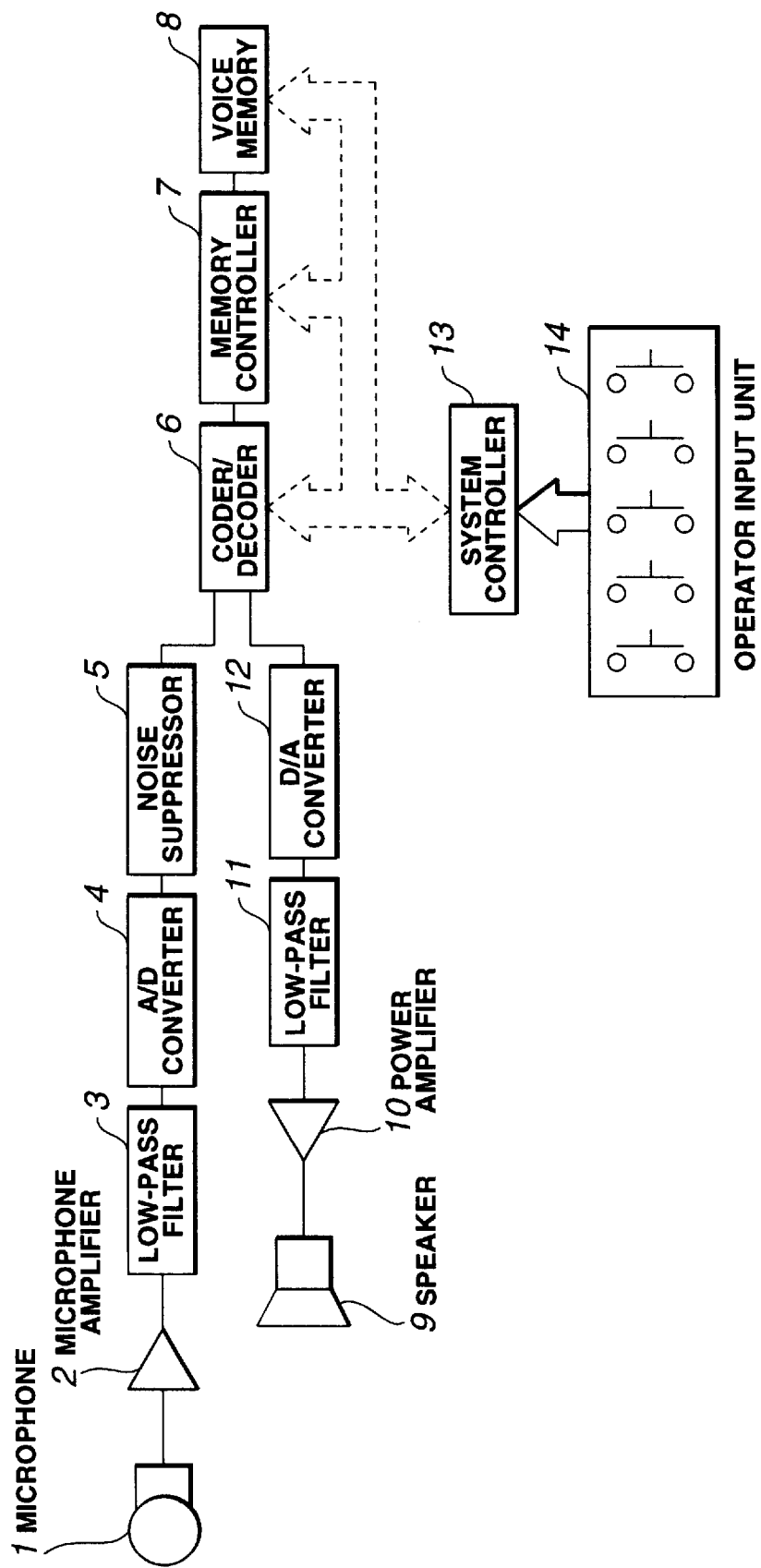
FIG. 1 is a block diagram showing an example of the entire construction of a voice record and playback apparatus according to a first embodiment of the present invention.
Figure 2:
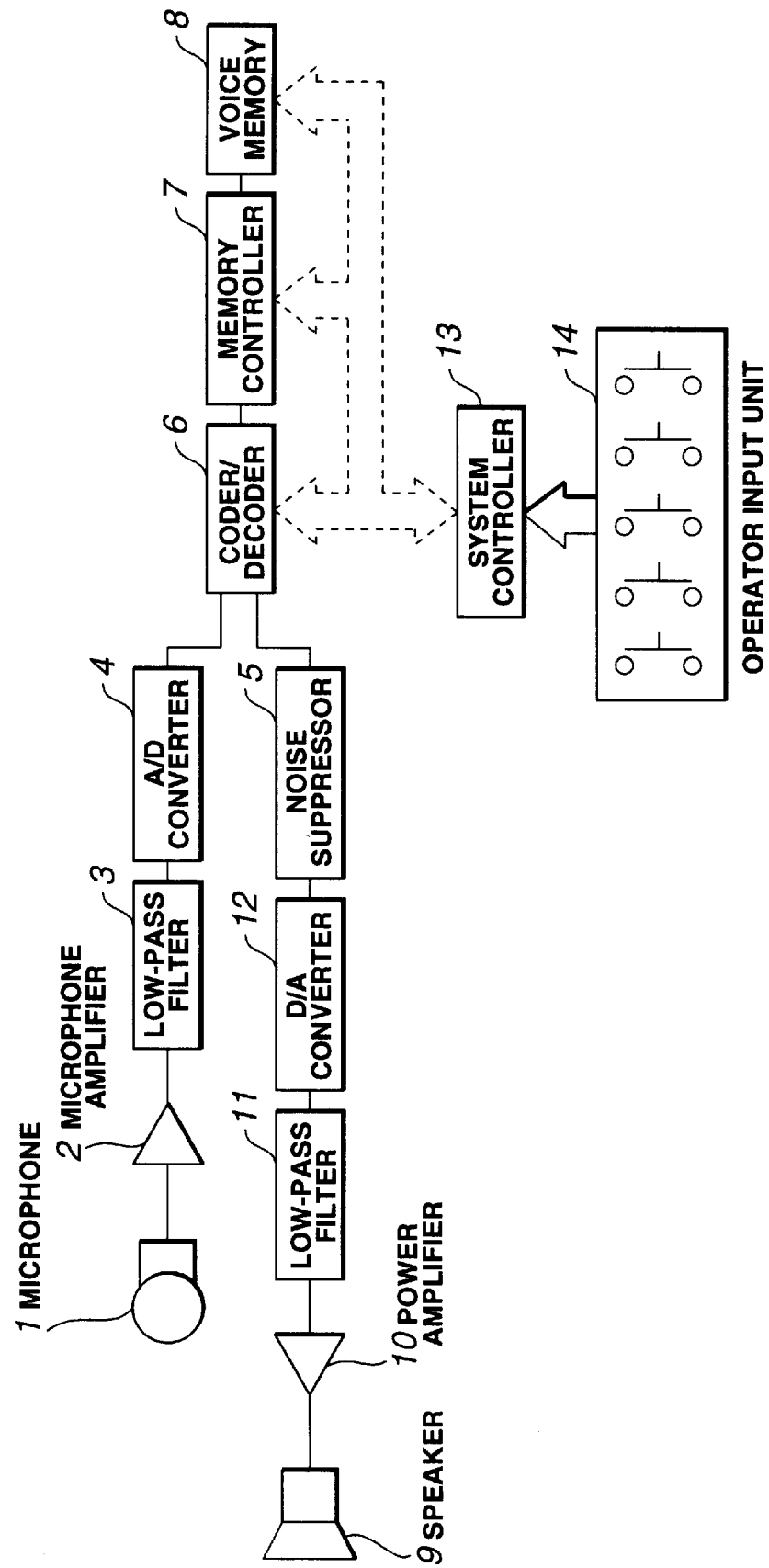
FIG. 2 is a block diagram showing another example of the entire construction of a voice record and playback apparatus according to the first embodiment of the present invention.
Figure 3:
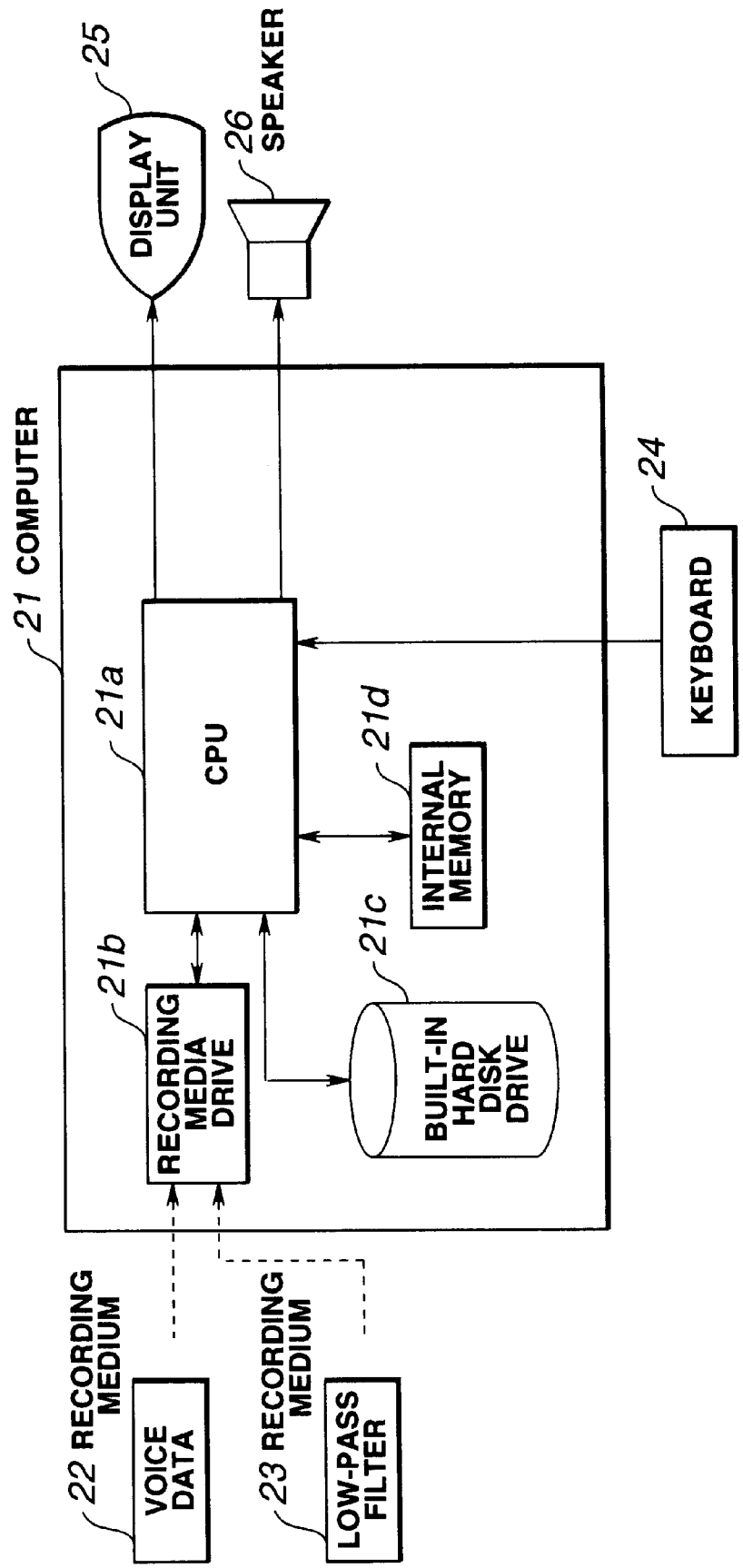
FIG. 3 is a block diagram showing the construction of playing voice data recorded on a recording medium back using a computer in the first embodiment.

Hereinafter, embodiments of the present invention will be described with reference to drawings. FIGS. 1 to 7 show a first embodiment of the present invention, and FIG. 1 is a block diagram showing an example of the entire construction of a voice record and playback apparatus. Furthermore, FIG. 2 is a block diagram showing another example of the entire construction of a voice record and playback apparatus, and FIG. 3 is a block diagram showing the construction of playing back voice data recorded on a recording medium using a computer.

In this first embodiment, a noise suppression apparatus and a processing program recorded on a recording medium included in the present invention are activated when a voice signal is recorded and played back using a voice record and playback apparatus and a computer.

First, an example of the construction of the voice record and playback apparatus will be described with reference to FIG. 1.

This voice record and playback apparatus, as shown in FIG. 1, comprises: a microphone 1 converting inputted voice data into an electric signal; a microphone amplifier 2 for amplifying a voice signal from this microphone 1 to an adequate level; a low-pass filter 3 for removing unnecessary high-frequency components from the voice signal amplified by this microphone amplifier 2; an A/D converter 4 for converting the analog voice signal outputted from this low-pass filter 3 into digital data; a noise suppressor 5 that is a noise suppression apparatus that reduces noise signal components included in this voice signal converted into digital data; a coder/decoder 6 coding (compressing) the voice signal outputted from this noise suppressor 5 at the time of recording and decoding (decompressing) coded data at the time of playback; a memory controller 7 controlling operation of record/playback of voice information in voice memory 8, which is described later, on the basis of address information obtained from a system controller 13 described later; the voice memory 8 composed of, for example, a semiconductor memory; a D/A converter 12 for converting a digital voice signal outputted from the coder/decoder 6 into an analog signal; a low-pass filter 11 for removing unnecessary high-frequency components from a voice signal converted into the analog signal by this D/A converter 12; a power amplifier 10 amplifying the analog signal outputted from this low-pass filter 11; a speaker 9 for playing the voice signal upon being driven by the power amplifier 10; an operator input unit 14 composed of various types of operation buttons or the like; and a system controller 13 which controls the entire voice record and playback apparatus including the coder/decoder 6, memory controller 7, and voice memory 8 and connecting to the output of the operator input unit 14.

In the example shown in FIG. 1, the noise suppressor 5 is located in the input side, i.e., as a stage prior to the coder in the coder/decoder 6. As described above, it is impossible to perform good coding in the voice coding based on the linear predictive analysis if background noise is mixed with the inputted voice data. Therefore, by performing noise suppression processing as preprocessing, it becomes possible to perform coding with better sound quality.

In addition, in the voice record and playback apparatus shown in FIG. 2, the noise suppressor 5 is located in the output side, i.e., as a stage subsequent to the decoder in the coder/decoder 6. The other components are the same as those shown in FIG. 1. Although a calculation amount in the coding process as described above, becomes huge in voice coding based on the linear predictive analysis, a calculation amount in the decoding process is considerably smaller than that in coding process. Therefore, by performing noise suppression processing after decoding processing in this manner, this apparatus has an advantage of having substantially no influence on the overall processing time.

FIG. 3 is a block diagram showing the construction of playing back voice data recorded on a recording medium using a computer.

A recording medium 22 for recording voice data, and a recording medium 23 for recording a noise suppression program are mounted in a recording media drive 21b of a computer 21, and hence the drive 21b can read the data recorded on these recording media 22 and 23. As these recording media 22 and 23, for example, floppy disks and CD-ROMs can be used.

The CPU 21a connects to not only internal memory 21d which becomes a working area at the time of performing processing control, but also to a built-in hard disk drive 21c for saving the noise suppression program and voice data read by the recording media drive 21b.

Regenerative processing is performed on the voice data, as described above, by a voice regenerative processing program saved in the built-in hard disk drive 21c or the like. In that time, the noise suppression program is also read from the built-in hard disk drive 21c, and is executed after being developed in the internal memory.

Furthermore, the CPU 21a connects to a keyboard 24 attached to computer 21 so that a user can input various types of commands, if necessary.

In addition, computer 21 connects to a display unit 25 for visually displaying various types of information according to the processing performed, and to a speaker 26 for playing a voice signal processed by the voice regenerative processing program described above.

In the construction of the embodiment discussed heretofore, a recording medium recording a processing program for removing a noise signal included in a voice signal, the built-in hard disk drive 21c and the internal memory 21d such as RAM are included in the computer 21 as well as the above-described recording medium 23 (a floppy disk, a CD-ROM, etc.).

Figure 4:
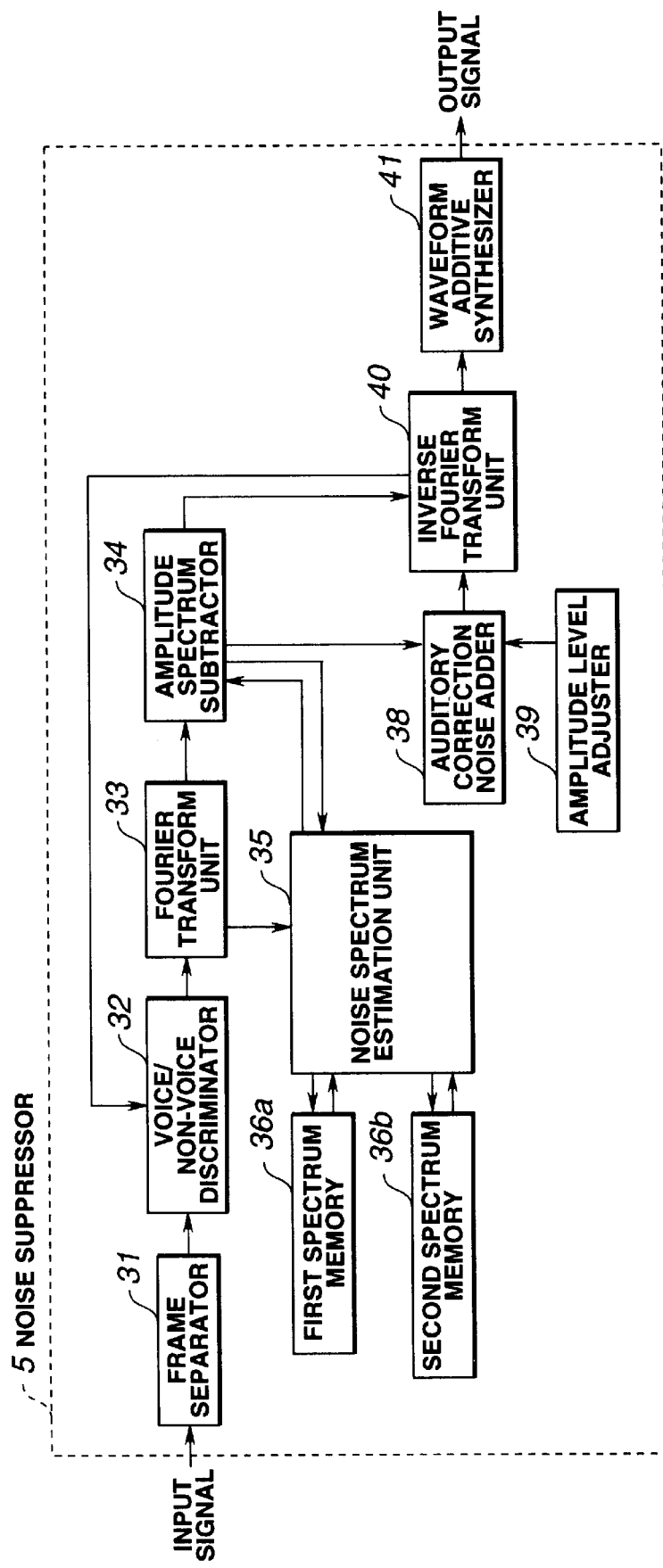
FIG. 4 is a block diagram showing the detailed construction of a noise suppression of the first embodiment.

Next, FIG. 4, is a block diagram showing the detailed construction of the noise suppressor 5.

This noise suppressor 5 comprises: a frame separator 31 separating an input signal into frames of a predetermined length; a voice/non-voice frame discriminator 32 that is a voice discrimination means that adds discriminating information such as a flag upon judging whether the voice signal separated into frames is a voice or non-voice frame on the basis of its energy level, and also receives an output of an inverse Fourier transform unit 40 described later; a Fourier transform unit 33 that is a spectrum analysis means that analyzes spectrum components by performing Fourier transform (FFT) to an output of voice/non-voice discriminator 32 and outputs spectrum information; a noise spectrum estimation unit 35 that is a noise spectrum estimation means that estimates a noise spectrum included in this frame on the basis of an output of Fourier transform unit 33 and an output of a first spectrum memory 36a or a second spectrum memory 36b, both of which are described later, if the output of Fourier transform unit 33 is an output according to a non-voice frame; the first spectrum memory 36a and second spectrum memory 36b for storing the noise spectra that are estimated by noise spectrum estimation unit 35 and relate to non-voice frames of, for example, two prior frames; an amplitude spectrum subtractor 34 that is a spectrum subtraction means that subtracts a product of the noise spectrum estimated by noise spectrum estimation unit 35 and a predetermined coefficient from an output of the Fourier transform unit 33; an amplitude level adjuster 29 making a amplitude level of an auditory correction noise spectrum optionally adjustable; an auditory correction noise adder 38 that is a spectrum addition means that adds an output of the amplitude spectrum subtractor 34 to the auditory correction noise spectrum whose amplitude level is adjusted by amplitude level adjuster 39; an inverse Fourier transform unit 40 that is a time-domain signal conversion means that performs inverse Fourier transform (IFFT) to an output of auditory correction noise adder 38 or an output of the amplitude spectrum subtractor 34; and a waveform additive synthesizer 41 that performs additive synthesis of output waveforms of inverse Fourier transform unit 40 and outputs its result.

Figure 5:
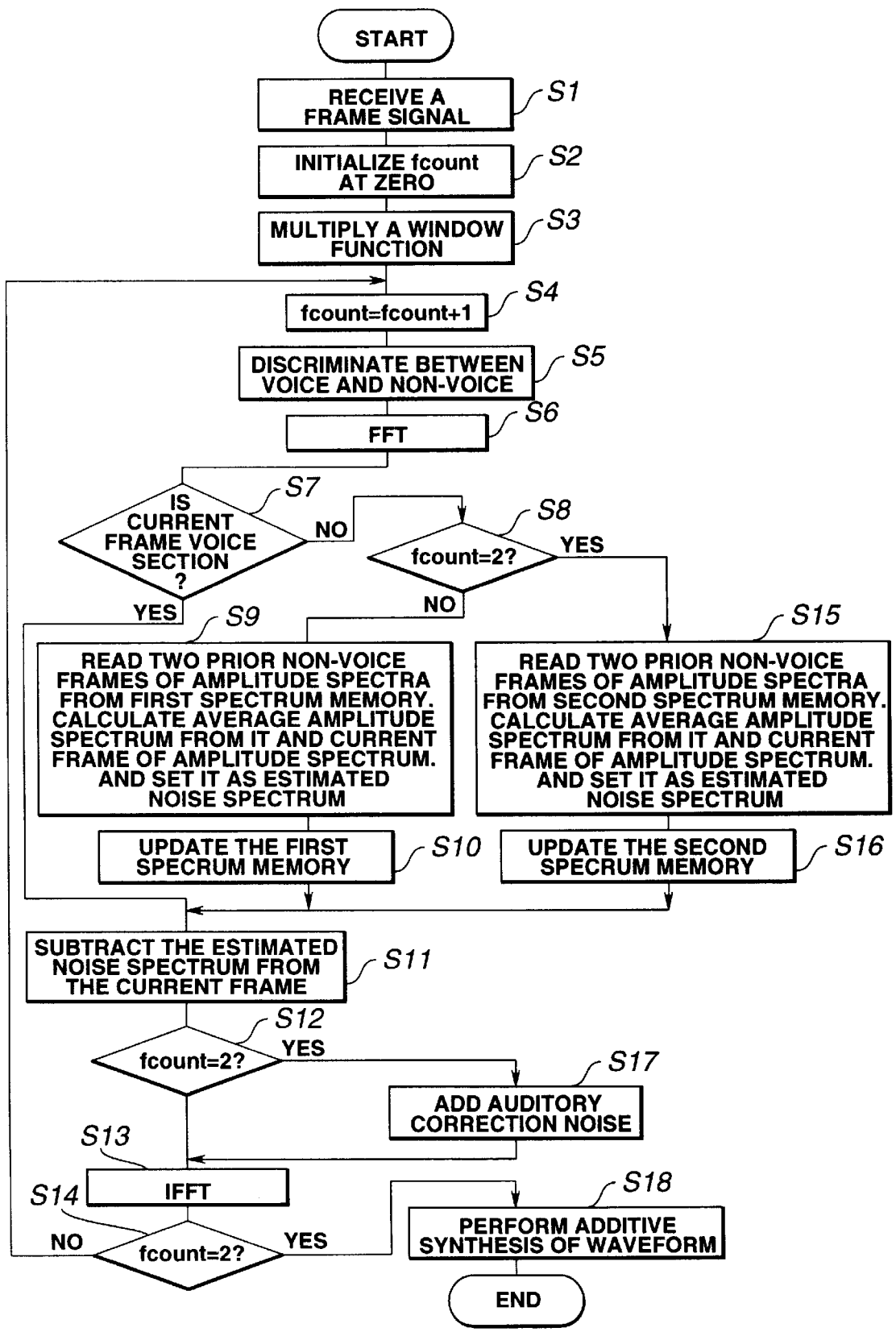
FIG. 5 is a flow chart showing the operation of the noise suppressor or the control executed by a processing program in a computer in the first embodiment.

FIG. 5 is a flow chart showing the operation of the noise suppressor 5 that is described above or the control executed by a processing program in the computer 21.

When the operation starts, the frame separator 31 separates an input signal into frames of a predetermined length (step S1).

Next, a variable fcount for counting the frequency of spectrum subtractions is initialized at zero (step S2).

Then, in order to obtain a frequency resolution precision necessary for Fourier analysis in the latter stage, multiplication of a window function is performed to a frame signal (step S3). At this time, the process is performed so that frames may overlap each other to prevent discontinuous waveforms in frame boundaries.

This state is shown in FIG. 6. FIG. 6 is an explanatory drawing showing the performance of multiplication processing of window functions so that the window functions may overlap each other. In the example shown in this figure, analysis windows overlapping each other by 50% in the time domain are selected.

In addition, as a window function, for example, the Hanning window shown in the following formula 1 is used.

$$w(n)=0.5-\cos\{2\pi n/(L-1)\} \quad (1)$$

wherein L represents samples/frame, n represents the sample's position in the frame, i.e., n=(0, 1, ..., L−1).

Subsequently, the value of the variable fcount showing the frequency of the spectrum subtractions is incremented by one (step S4), and voice/non-voice discrimination processing of the frame signal to which multiplication of a window function is performed is performed by the voice/non-voice discriminator 32 (step S5). In regard to methods of this discriminating processing, various types of methods have been proposed up to now. For example, the methods recited in Japanese Patent Application No. 8-92768 can be applied.

After that, by performing the Fourier transform (FFT) to the frame signal in the Fourier transform unit 33, spectrum components are analyzed and spectrum information is outputted (step S6).

Next, on the basis of the discrimination result obtained in step S5, it is judged whether or not the current frame is a voice section (step S7). If it is not a voice section, it is further judged whether fcount=2 (step S8).

Here, if it is not fcount=2, the amplitude spectra of two prior non-voice frames are read from the first spectrum memory 36a, an average amplitude spectrum is calculated from these spectra and the current frame amplitude spectrum, and the average amplitude spectrum is set as an estimated noise spectrum (step S9).

First spectrum memory 36a has a storage capacity of a predetermined number of frames (in this example, two frames) of spectrum data, and its initial values can be the spectrum data in the first non-voice frame from the start of processing or all zeros.

Figure 7:
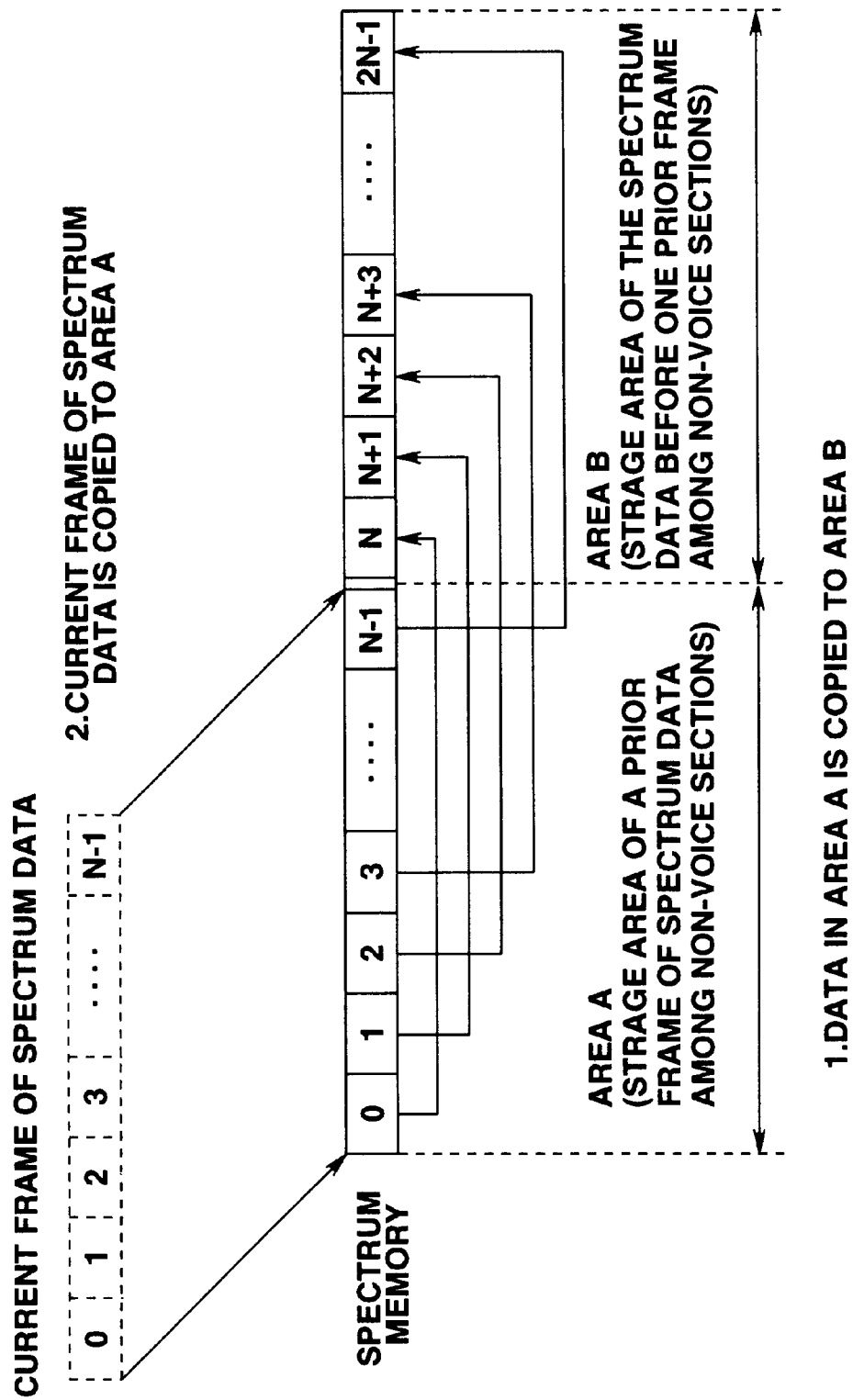
FIG. 7 is a drawing showing the operation at the time of updating spectrum memory in the first embodiment.

Next, contents of the first spectrum memory 36a are updated as shown in FIG. 7 (step S10).

FIG. 7 is a drawing showing the operation at the time of updating spectrum memory.

This spectrum memory can save two frames of frame data composed of N samples. Therefore, a memory area of a first prior frame of spectrum data is called an area A, and a memory area of the second prior frame of spectrum data among non-voice sections is an area B.

When the spectrum memory is updated in the construction like this, first, the spectrum data saved in the area A is shifted to the area B, and next, the current frame of spectrum data is copied to the area A.

Subsequently, according the following formula 2, the amplitude spectrum subtractor 34 subtracts the product of the estimated noise spectrum and a subtraction coefficient from the current frame amplitude spectrum (step S11).

$$E(n) = \begin{cases} S(n) - a \cdot N(n) & \text{if } S(n) \geq a \cdot N(n) \\ 0 & \text{else} \end{cases} \quad (2)$$

where S(n) shows an amplitude spectrum of an input signal in the current frame, N(n) is an estimated noise spectrum, and "a" is a subtraction coefficient.

Then, it is judged whether fcount=2 (step S12). Here, as with the judgement performed at step S8, fcount is not equal to two presently, and hence the inverse Fourier transform unit 40 performs the inverse Fourier transform (IFFT) (step S13).

Furthermore, the process again judges whether or not fcount=2 (step S14). In this example, the process returns to step S4 because the value of fcount is the same as those at the steps S8 and S12, i.e., not equal to 2, and the same operations as in steps S4 to S8 are performed.

Moreover, if it is judged that fcount is equal to two at step S8, the amplitude spectra of two prior non-voice frames are read from the second spectrum memory 36b, an average amplitude spectrum is calculated from them and the current frame amplitude spectrum, and the average amplitude spectrum is set as an estimated noise spectrum (step S15).

This second spectrum memory 36b also has a storage capacity for spectrum data of a predetermined number of frames (in this example, two frames) similar to the first spectrum memory 36a, in which similar values as with the first spectrum memory can be used as the initial values.

Next, the contents of the second spectrum memory 36b are updated by shifting them as shown in FIG. 7 (step S16), and after tat, operation at the steps S11 and S12 is performed similarly to the above.

In this manner, a plurality of spectrum subtractions is repeated, and hence it is possible to obtain great improvement of the S/N ratio without distorting the shapes of voice spectra.

At step S12, since it is judged that fcount=2 in the present example, the auditory correction noise adder 38 adds a predetermined auditory correction noise spectrum (step S17). This auditory correction noise spectrum is, for example, a noise spectrum having a predetermined spectrum inclination. Alternatively, it is also good to save a predetermined frame of spectrum judged as non-voice in the voice/non-voice discriminator 32 and to multiply this spectrum by a predetermined value that is smaller than one.

Then, the process goes to step S13, and the inverse Fourier transform (IFFT) is performed. Since it is judged at step S14 that fcount=2, the waveform additive synthesizer 41 performs additive synthesis of waveforms with a method such as that shown in FIG. 5 (step S18), and the process is ended.

According to the first described embodiment, since a masking effect is produced by adding the auditory correction noise, the residual components caused by the spectrum subtractions are not sensed as an unnatural sound.

Furthermore, it becomes possible to avoid the undesired effect of auditory unnaturalness caused by noise suppression being largely different between a non-voice section and a voice section.

In addition, if the noise suppressor is provided in the output side, it becomes possible to exhibit a similar effect, and for a listener himself/herself to optionally set the level of the auditory correction.

In this manner, by means of simple construction and processing, it becomes possible to improve the S/N ratio and to increase auditory sound quality.

Figure 8:
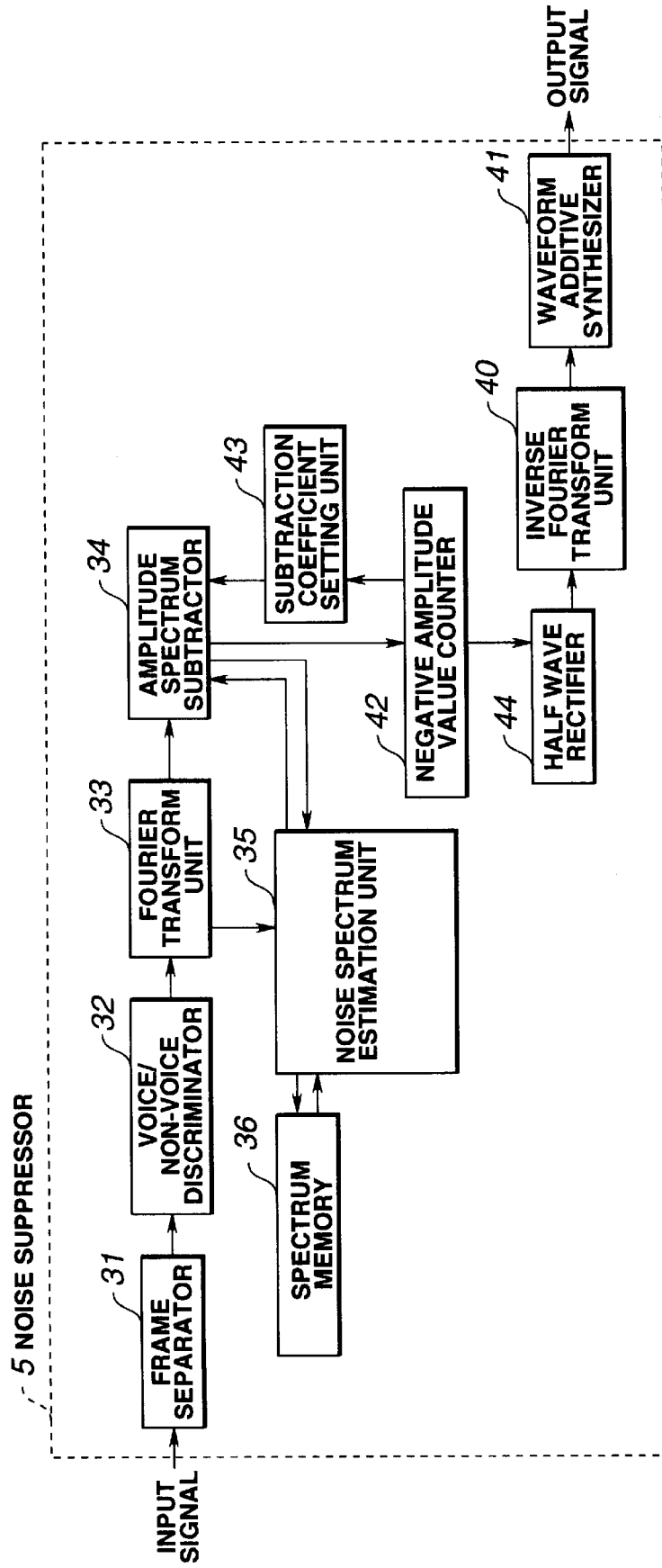
FIG. 8 is a block diagram showing the detailed construction of the noise suppressor according to a second embodiment of the present invention.
Figure 9:
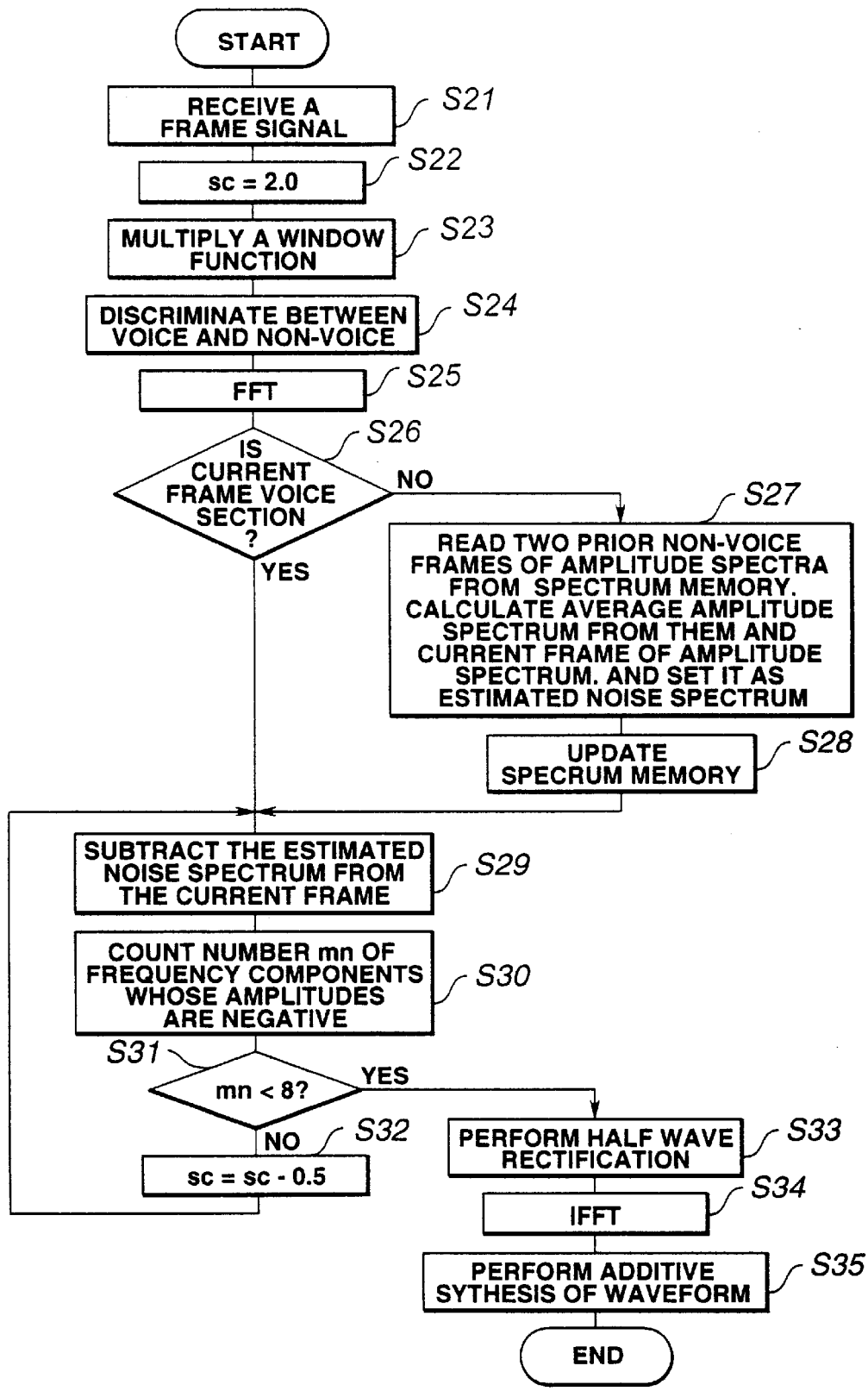
FIG. 9 is a flow chart showing the operation of the noise suppressor or the control executed by a processing program in a computer in the second embodiment.

FIGS. 8 and 9 show a second embodiment of the present invention, FIG. 8 is a block diagram showing the detailed construction of noise suppressor 5, and FIG. 9 is a flow chart showing the operation of the noise suppressor or the control executed by a processing program in a computer.

In this second embodiment, the same reference symbols are assigned to the parts which are the same as those in the first embodiment, and accordingly, description of them will be omitted while the differing points will be described.

The construction of a voice record and playback apparatus and a computer to which a noise suppressor and a processing program for removing noise that are included in this second embodiment are similar to those shown in FIGS. 1 to 3 according to the first embodiment.

Next, the detailed construction of a noise suppressor 5 in this embodiment will be described with reference to FIG. 8.

The noise suppressor 5 comprises the frame separator 31; the voice/non-voice discriminator 32 that adds discriminating information such as a flag upon discriminating whether the separated voice signal frames are voice or non-voice on the basis of its energy level; the Fourier transform unit 33; the noise spectrum estimation unit 35 that estimates a noise spectrum included in a frame based on an output of Fourier transform unit 33 with reference to a spectrum memory 36 to be described later; the spectrum memory 36 that saves the noise spectra that are estimated by noise spectrum estimation unit 35 over, for example, two prior frames; the amplitude spectrum subtractor 34; a negative amplitude value counter 42 that is an evaluation means that evaluates whether a subtraction coefficient is adequate by counting the number of frequency components whose amplitudes are negative in an output of amplitude spectrum subtractor 34, and a control means that makes the amplitude spectrum subtractor 34 and a subtraction coefficient setting unit 43, to be described later, repeatedly perform processing until the subtraction coefficient becomes adequate if the subtraction coefficient is not adequate; the subtraction coefficient setting unit 43 that is a coefficient modification means that sets the subtraction coefficient based on an output of this negative amplitude counter 42 and outputs the subtraction coefficient to the amplitude spectrum subtractor 34; a half wave rectifier 44 performing half wave rectification to an output of the negative amplitude value counter 42; an inverse Fourier transform unit 40 that performs inverse Fourier transform (IFFT) to an output of this half wave rectifier 44; and a waveform additive synthesizer 41 that performs additive synthesis to output waveforms of this inverse Fourier transform unit 40 and outputs its result.

Next, the operation of the noise suppressor 5 described above or the control performed by a processing program in the computer 21 will be described with reference to the flow chart in FIG. 9.

When the operation starts, the frame separator 31 separates an input signal into frames of a predetermined length (step S21).

Next, subtraction coefficient sc is initialized at 2.0 (step S22).

Then, in order to obtain the frequency resolution precision necessary for Fourier analysis in the latter stage, multiplication of a window function is performed to a frame signal (step S23). At this time, the process is performed using the Hanning window shown in formula 1 above so that frames may overlap each other.

Subsequently, the voice/non-voice discriminator 32 performs voice/non-voice discrimination processing to the frame signal to which multiplication of a window function is performed (step S24).

After that, by performing the Fourier transform (FFT) to the frame signal in the Fourier transform unit 33, spectrum components are analyzed and spectrum information is outputted (step S25).

Next, on the basis of the discrimination result obtained in step S24, it is judged whether or not the current frame is a voice section (step S26).

If it is not the voice section, the amplitude spectra of two prior non-voice frames are read from the spectrum memory 36, an average amplitude spectrum is calculated from them and the current frame amplitude spectrum, and the average amplitude spectrum is set as an estimated noise spectrum (step S27).

Spectrum memory 36, which is similar to the spectrum memory in the first embodiment, also has a storage capacity for spectrum data of a predetermined number of frames (in this example, two frames) wherein the initial values can be the spectrum data in the first non-voice frame from the start of processing or all zeros.

Next, contents of the spectrum memory 36 are updated as shown in FIG. 7 (step S28).

If it is judged at step S26 that the current frame is a voice section or the step S28 has ended, according to the following formula 3, the amplitude spectrum subtractor 34 subtracts the product of the estimated noise spectrum and the subtraction coefficient from the amplitude spectrum of the current frame (step S29).

$$E(n)=S(n)-sc \cdot N(n) \quad (3)$$

where S(n) shows an amplitude spectrum of an input signal in the current frame, N(n) is an estimated noise spectrum, and sc is the subtraction coefficient.

Then, the negative amplitude value counter 42 counts the number mn of the frequency components whose amplitudes are negative (step S30), and it is judged whether this number mn is smaller than a predetermined value (for example, eight) (step S31).

Here, if the number mn is equal to or more than the predetermined value, the subtraction coefficient setting unit 43 subtracts 0.5 from the subtraction coefficient sc (step S32), and thereafter the subtraction is performed at the step S29.

The operation at the steps S29 to S32 is repeatedly executed in this manner until the negative amplitude value counter 42 judges that the number mn is smaller than the predetermined value.

In this manner, if the counter judges at step S31 that the number mn is smaller than the predetermined value, the half wave rectifier 44 performs the half wave rectification and the values of the frequency components that are negative are replaced with zeros (step S33).

After that, the inverse Fourier transform unit 40 performs the inverse Fourier transform (IFFT) (step S34), and furthermore, the waveform additive synthesizer 41 performs additive synthesis to waveforms using a method such as that shown in FIG. 6 (step S35). Then, the process is ended.

According to the second embodiment described above, since it is possible to set subtraction coefficients adequate to respective frames, it becomes possible to improve the S/N ratio and to enhance auditory sound quality by suppressing excessive distortion of spectrum shapes.

Figure 10:
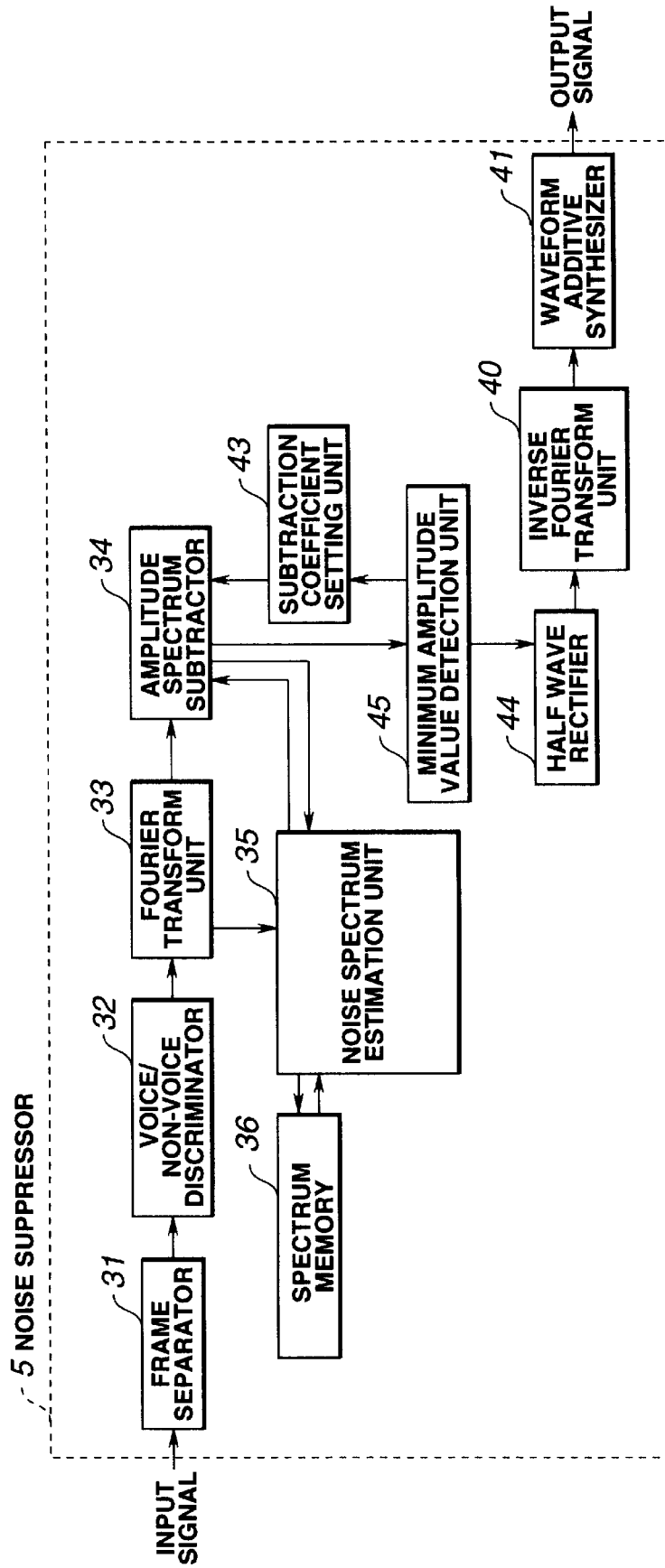
FIG. 10 is a block diagram showing the detailed construction of the noise suppressor according to a third embodiment of the present invention.
Figure 11:
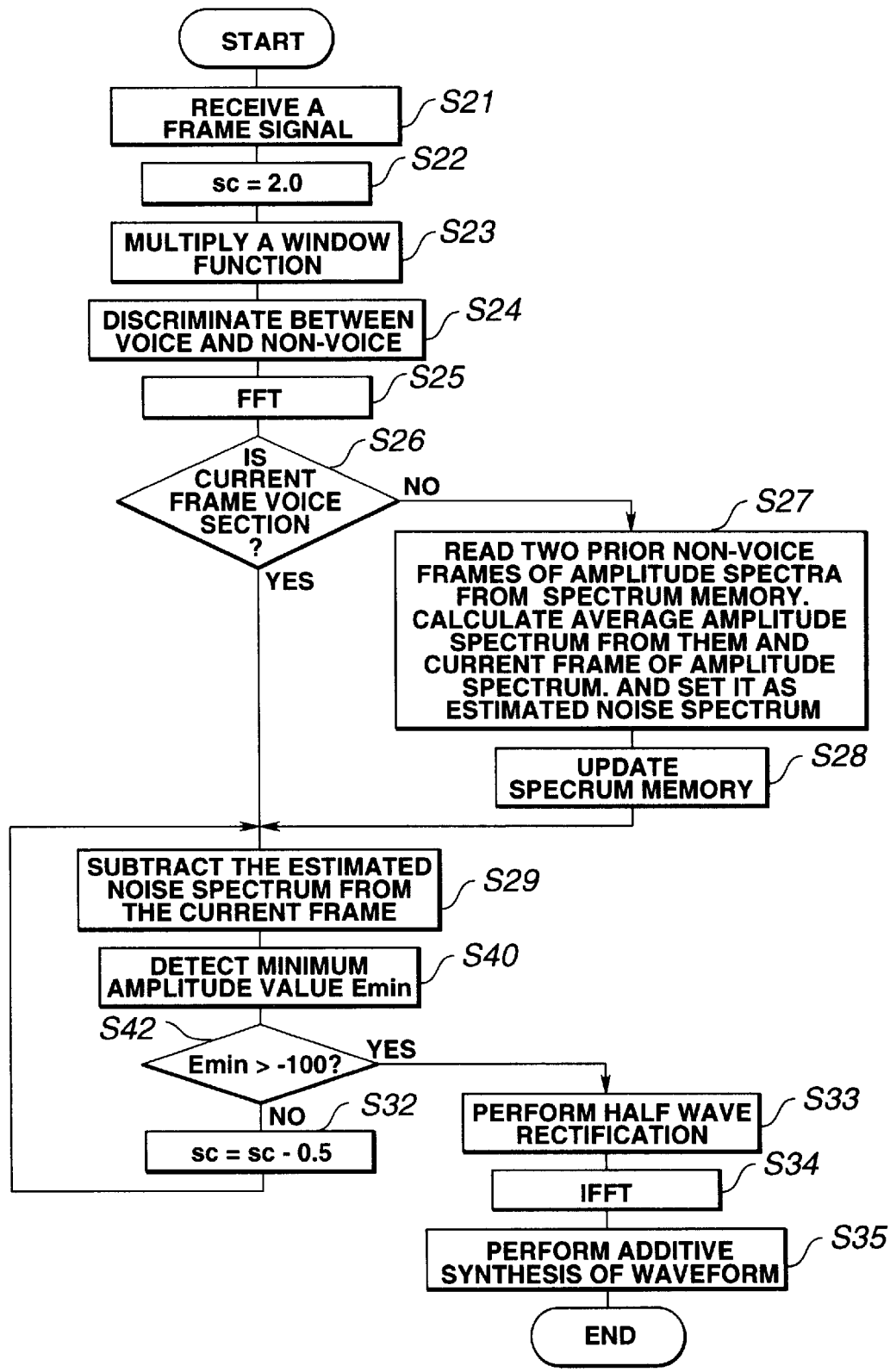
FIG. 11 is a flow chart showing the operation of the noise suppressor or the control executed by a processing program in a computer in the third embodiment.

FIGS. 10 and 11 show a third embodiment of the present invention. FIG. 10 is a block diagram showing another detailed construction of noise 5 suppressor, and FIG. 11 is a flow chart showing the operation of the noise suppressor or the control executed by a processing program in a computer. In this third embodiment, the same reference symbols are assigned to the parts which are the same as those in the first and second embodiments, and accordingly, description of them will be omitted while the differing points will be described.

The construction of a voice record and playback apparatus and a computer in which a noise suppressor and a processing program for removing noise are included in this third embodiment are similar to those shown in FIGS. 1 to 3 according to the first embodiment.

First, the noise suppressor of the third embodiment will be described with reference to FIG. 10.

The noise suppressor comprises a minimum amplitude value detection unit 45 instead of the negative amplitude value counter 42 in the second embodiment.

Thus, an output of the amplitude spectrum subtractor 34 is inputted to the minimum amplitude value detecting unit 45 that is an evaluation means and a control means. Then, a frequency component with a minimum amplitude is extracted, and the amplitude value and a predetermined value are compared with each other.

An output of this minimum amplitude value detecting unit 45 is inputted to the subtraction coefficient setting unit 43, where the subtraction coefficient is modified.

In addition, if the minimum amplitude value detecting unit 45 evaluates that the subtraction coefficient is adequate, the output is inputted to the half wave rectifier 44, which performs the half wave rectification to the output.

Subsequently, the operation of the third embodiment will be described with reference to FIG. 11.

After the amplitude spectrum subtractor 34 subtracts the product of the estimated noise spectrum and a subtraction coefficient from the current frame amplitude spectrum at the step S29, the minimum amplitude value detecting unit 45 detects a minimum amplitude value Emin (step S40).

Then, it is judged whether this minimum amplitude value Emin is larger than a predetermined value (for example, −100) (step S42).

If this minimum amplitude value Emin is equal to or less than the predetermined value (for example, −100), the process goes to step S32. On the other hand, if larger than the predetermined value, the process goes to step S33, and thereafter performs the operation similar to that shown in FIG. 9.

According to the third embodiment as described above, by detecting the minimum amplitude value, it becomes possible to exhibit the same effects as those of the second embodiment.

Figure 12:
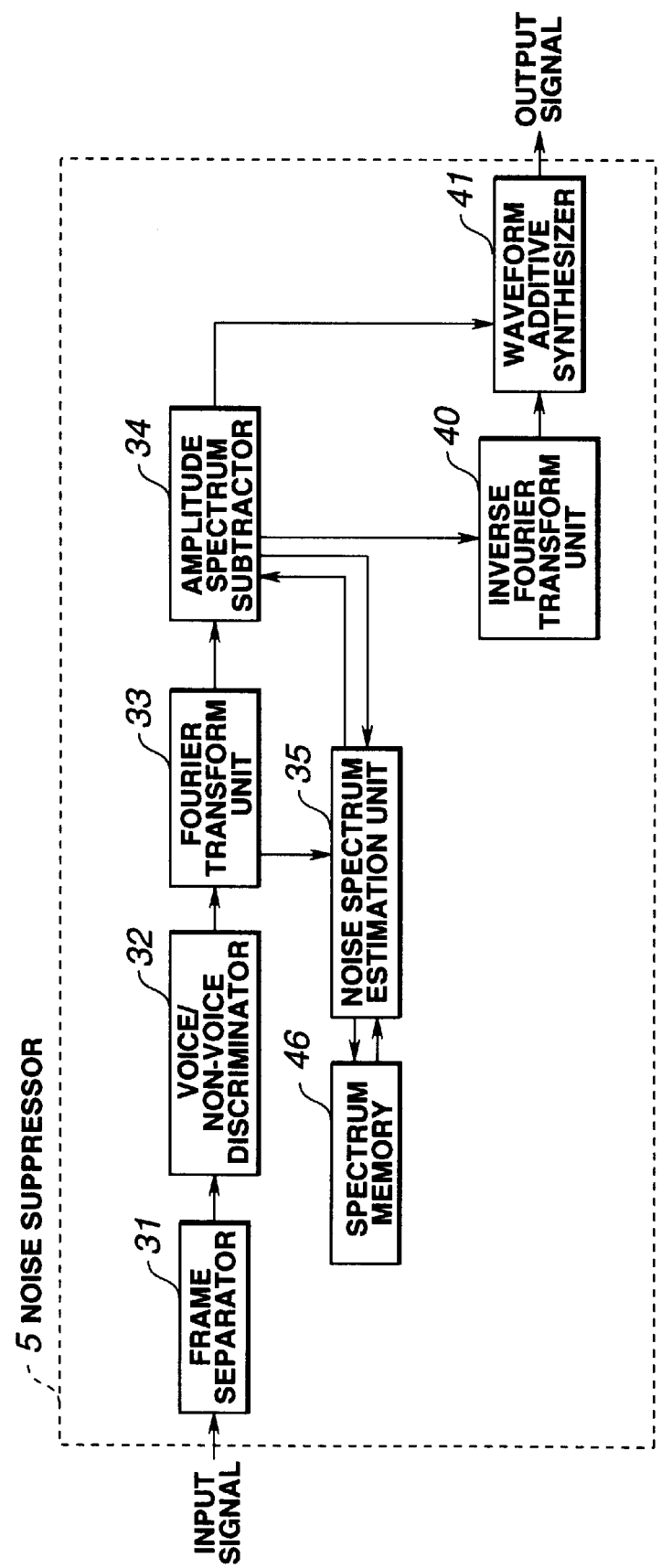
FIG. 12 is a block diagram showing the detailed construction of the noise suppressor according to a fourth embodiment of the present invention.
Figure 13:
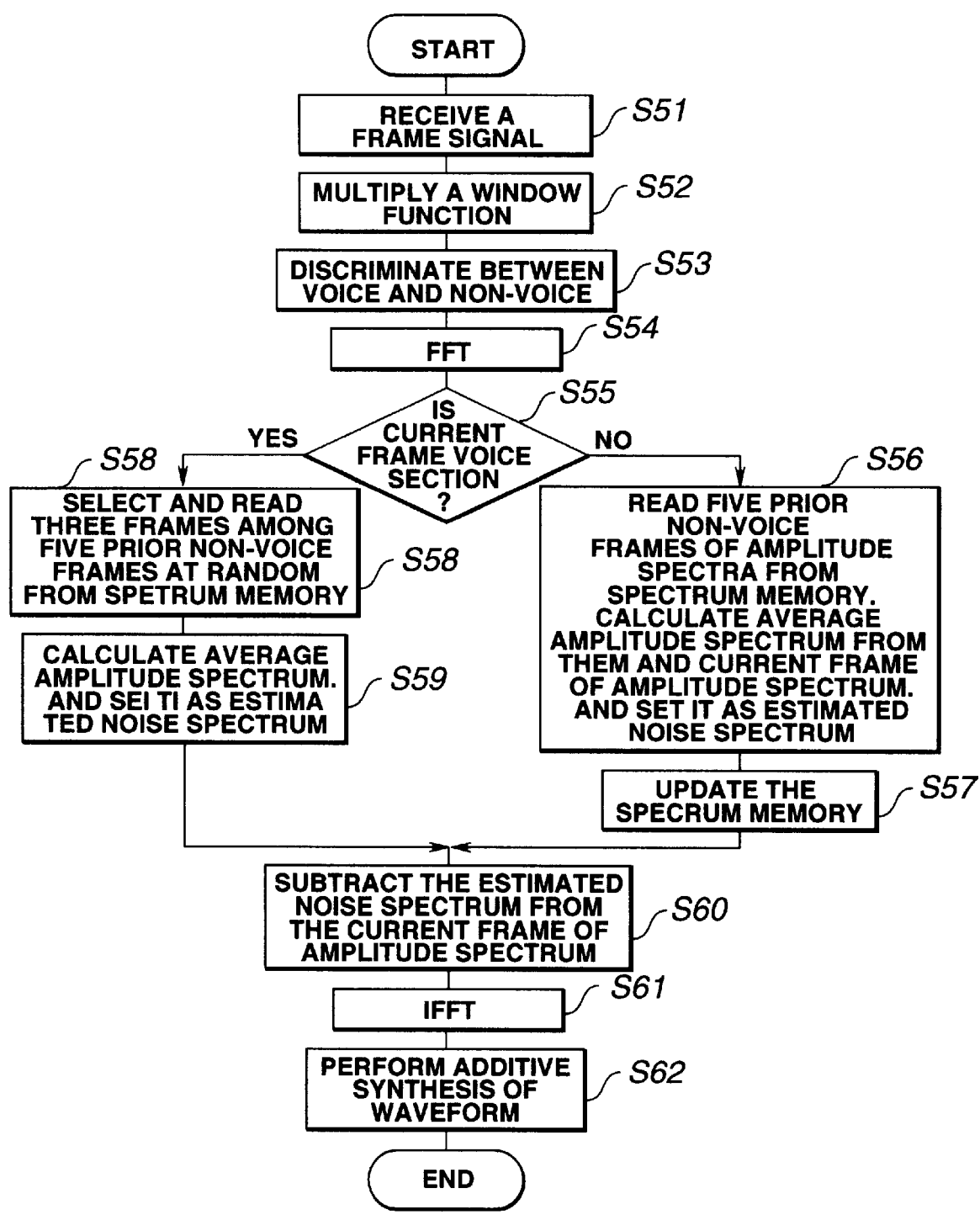
FIG. 13 is a flow chart showing the operation of the noise suppressor or the control executed by a processing program in a computer in the fourth embodiment.
Figure 14:
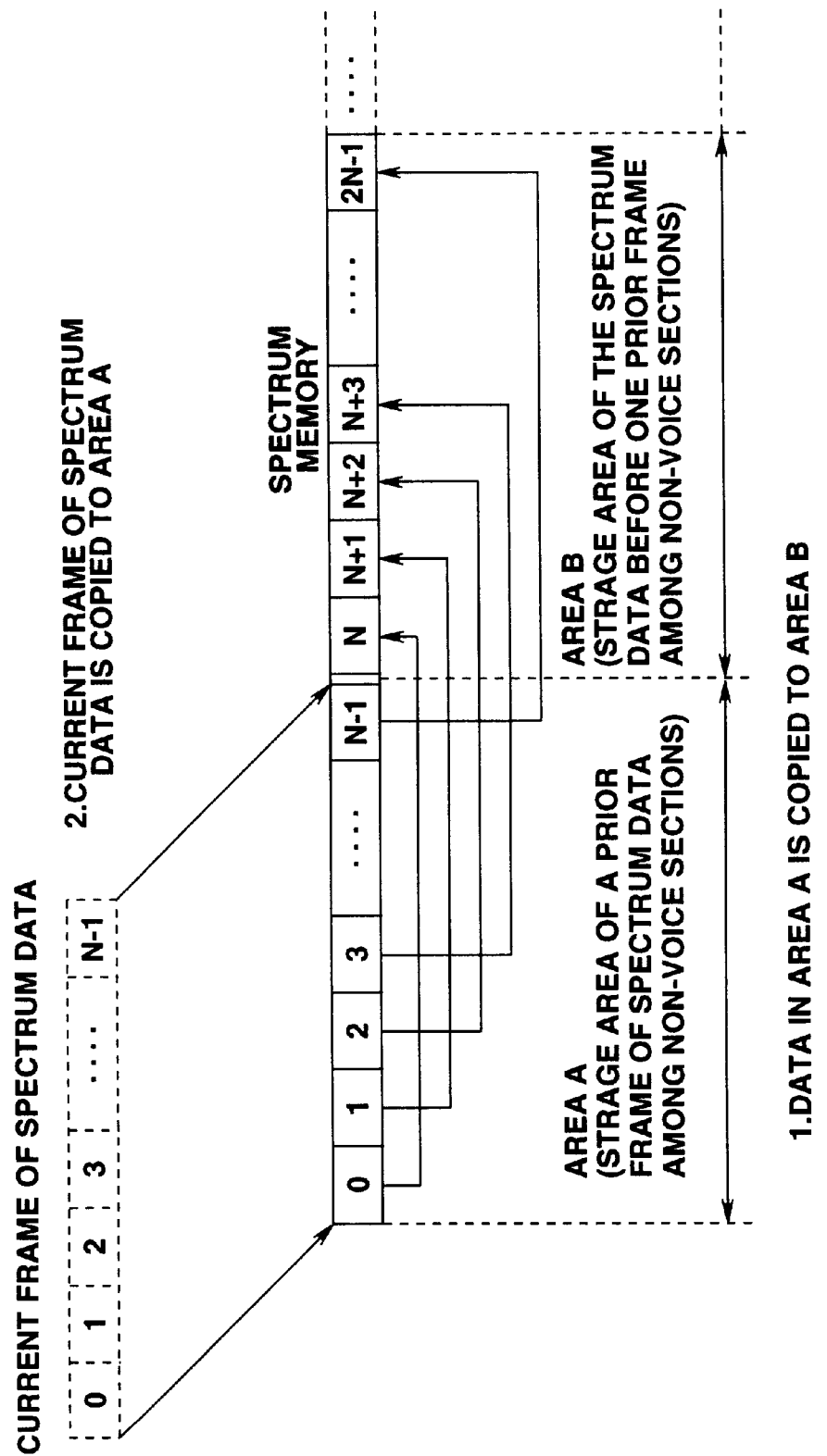
FIG. 14 is a drawing showing the operation at the time of updating spectrum memory in the fourth embodiment.

FIGS. 12 to 14 show a fourth embodiment of the present invention, and FIG. 12 is a block diagram showing a detailed construction of the noise suppressor. Furthermore, FIG. 13 is a flow chart showing the operation of the noise suppressor or the control executed by a processing program in a computer, and FIG. 14 is a drawing showing the operation at the time of updating spectrum memory.

In this fourth embodiment, the same reference symbols are assigned to the parts which are the same as those in the first to third embodiments, and accordingly, description of them will be omitted while the differing points will be described.

The construction of a voice record and playback apparatus and a computer in which a noise suppressor and a processing program for removing noise are included in this fourth embodiment are similar to those shown in FIGS. 1 to 3 according to the first embodiment.

Next, the detailed construction of a noise suppressor 5 in this embodiment will be described with reference to FIG. 12.

The noise suppressor 5 comprises the frame separator 31; the voice/non-voice discriminator 32; the Fourier transform unit 33; the noise spectrum estimation unit 35 that is the noise spectrum estimation means which estimates the noise spectrum included in a frame based on an output of Fourier transform unit 33 with reference to a spectrum memory 46 to be described later, as well as a spectrum writing means and an estimated noise spectrum calculation means; a spectrum memory 46 that is a spectrum recording means that saves the noise spectra relating to the non-voice frames and estimated by noise spectrum estimation unit 35 over, for example, five prior frames; an amplitude spectrum subtractor 34; an inverse Fourier transform unit 40 that performs inverse Fourier transform (IFFT) to an output of the amplitude spectrum subtractor 34; and a waveform additive synthesizer 41 that performs additive synthesis of output waveforms of inverse Fourier transform unit 40 and outputs its result.

Next, the operation of the noise suppressor 5 described above or the control performed by a processing program in the computer 21 will be described with reference to the flow chart in FIG. 13.

When the operation starts, the frame separator 31 separates an input signal into frames of a predetermined length (step S51).

Then, in order to obtain the frequency resolution precision necessary for Fourier analysis in the latter stage, multiplication of a window function as shown in FIG. 6 is performed to a frame signal (step S52). At this time, the process is performed to frames using the Hanning window shown in formula 1 above so that the frame overlap each other.

Subsequently, the voice/non-voice discriminator 32 performs voice/non-voice discrimination processing to the frame signal to which multiplication of a window function is performed (step S53).

After that, by performing the Fourier transform (FFT) to the frame signal in the Fourier transform unit 33, spectrum components are analyzed and spectrum information is outputted (step S54).

Next, on the basis of the discrimination result obtained in step S53, it is judged whether the current frame is a voice section (step S55).

If it is not a voice section, amplitude spectra of five prior non-voice frames are read from the spectrum memory 46, an average amplitude spectrum is calculated from them and the current frame amplitude spectrum, and the average amplitude spectrum is set as an estimated noise spectrum (step S56).

This spectrum memory 46 has a storage capacity for spectrum data of a predetermined number of frames (in this example, five frames), and its initial values can be the spectrum data in the first non-voice frame from the start of processing or all zeros.

Next, contents of the spectrum memory 46 are updated as shown in FIG. 14 (step S57).

The operation of updating this spectrum memory will be described with reference to FIG. 14.

This spectrum memory can save five frames of frame data composed of N samples. Thus, a memory area for the spectrum data of the first prior frame among non-voice sections is called an area A, a memory area for the spectrum data of the second prior frame is an area B, and similarly, a memory area that is used for the spectrum data of the fifth prior frame and not shown in the figure is called an area E.

In the construction described above, when the spectrum memory is updated, the spectrum data saved in an area D is first shifted to the area E. Next, the spectrum data saved in the area C is shifted to the area D. Furthermore, the spectrum data are shifted sequentially. When the spectrum data saved in the area A is shifted to the area B, the current frame spectrum data is copied in the area A.

On the other hand, if it is judged at step S55 that the current frame is a voice section, three frames of amplitude spectra that are selected at random from five prior non-voice frames saved in the spectrum memory 46 are read (step S58).

Then, an average amplitude spectrum of the amplitude spectra of these three frames is calculated, and the average amplitude spectrum is set as an estimated noise spectrum of the voice frame (step S59).

In this manner, when step S57 or step S59 is ended, the amplitude spectrum subtractor 34 subtracts the product of the estimated noise spectrum and the subtraction coefficient from the current frame amplitude spectrum according to formula 2 (step S60).

After that, the inverse Fourier transform unit 40 performs the inverse Fourier transform (IFFT) to an output of the amplitude spectrum subtractor 34 (step S61), and furthermore, the waveform additive synthesizer 41 performs additive synthesis to waveforms with a method such as that shown in FIG. 6 (step S62). Then, the process is ended.

According to the fourth embodiment discussed above, when a noise spectrum in a voice section is estimated, a predetermined number of frames are selected at random from a plurality of prior non-voice frames, an average amplitude spectrum is calculated and is set as an estimated noise spectrum. Therefore, it becomes rare that residual components caused by spectrum subtractions are sensed as an unnatural sound in comparison to the case in which a constant noise component different from background noise mixed in an actual voice section is subtracted in the conventional way.

In this manner, by means of simple construction and processing, it is possible to improve an S/N ratio and to enhance auditory sound quality.

In this invention, it is apparent that a wide variety of different working modes can be developed on the basis of this disclosure without departing from the spirit and scope of the invention. This invention is not restricted by any specific embodiment except being limited by the appended claims.

What is claimed is:

1. A noise suppression apparatus for removing noise from an input voice signal which is divided into a plurality of successive frame signals, each frame signal having a predetermined length, said apparatus comprising:
   a voice signal discriminator which identifies each frame signal as either a voice frame signal or a non-voice frame signal;
   a spectrum analyzer which converts each of said frame signals into a respective frequency-domain signal;
   a noise spectrum estimator which estimates a noise spectrum in each frame signal which has been identified as being a non-voice frame signal by said voice discriminator;

a spectrum subtractor which subtracts a spectrum which is a function of a noise spectrum estimated by said noise spectrum from each frequency-domain signal obtained by said spectrum analyzer;

a spectrum adder which adds an auditory correction spectrum to each output signal of said spectrum subtractor; and a time-domain signal converter which converts each output signal of said spectrum adder into a time-domain signal.

2. The noise suppression apparatus according to claim 1, wherein the auditory correction spectrum added to each spectrum subtractor output signal is obtained by repeating a series of operations in said voice discriminator, said spectrum analyzer, said noise spectrum estimator, and said spectrum subtraction means for a predetermined number of repetitions.

3. The noise suppression apparatus according to claim 2, wherein an amplitude level of the predetermined spectrum added by said spectrum adder is adjustable.

4. The noise suppression apparatus according to claim 2, wherein the auditory correction spectrum added by said spectrum adder is a noise spectrum having a predetermined spectrum inclination.

5. The noise suppression apparatus according to claim 2, wherein the auditory correction spectrum added by said spectrum adder is obtained by multiplying a frequency domain signal of a predetermined non-voice frame signal by a value that is smaller than 1.

6. The noise suppression apparatus according to claim 1, wherein an amplitude level of the auditory correction spectrum added by said spectrum adder is adjustable.

7. The noise suppression apparatus according to claim 1, wherein the auditory correction spectrum added by said spectrum adder is a noise spectrum having a predetermined spectrum inclination.

8. The noise suppression apparatus according to claim 1, wherein the auditory correction spectrum added by said spectrum adder is obtained by multiplying a frequency domain signal of a predetermined non-voice frame signal by a value that is smaller than 1.

9. A recording medium which contains a processing program for removing noise from an input voice signal which is divided into a plurality of successive frame signals, each frame signal having a predetermined length, the processing program being readable by a computer to execute the steps of:

identifying each frame signal as either a voice frame signal or a non-voice frame signal;

converting each of said frame signals into a respective frequency-domain signal;

estimating a noise spectrum in each frame signal that is identified as being a non-voice frame signal;

performing a mathematical operation on an estimated noise spectrum to obtain a first output spectrum; subtracting the first output spectrum from each of said frequency domain signals to obtain respective second output signals;

adding an auditory correction spectrum to the respective second output signals to obtain respective third output signals; and converting the respective third output signals into time-domain signals.

10. The recording medium according to claim 9, wherein said auditory correction spectrum added in said adding step is obtained by repeating said identifying step, said converting step, said estimating step, performing step, and said subtracting step a predetermined number of times.

11. The recording medium according to claim 8, wherein the auditory correction spectrum added in said adding step is a noise spectrum having a predetermined spectrum inclination.

12. The recording medium recording a processing program for processing noise removal from voice according to claim 8, wherein the auditory correction spectrum added in said adding step is obtained by multiplying a frequency domain signal of a predetermined non-voice frame signal by a value that is smaller than 1.

13. The recording medium according to claim 9, wherein the auditory correction spectrum added in said adding step is a noise spectrum having a predetermined spectrum inclination.

14. The recording medium according to claim 9, wherein the auditory correction spectrum added in said adding step is obtained by multiplying a frequency domain signal of a predetermined non-voice frame signal by a value that is smaller than 1.

15. A noise suppression apparatus for removing noise from an input voice signal which is divided into a plurality of successive frame signals, each frame signal having a predetermined length, said apparatus comprising:

a voice signal discriminator which identifies each frame signal as either a voice frame signal or a non-voice frame signal;

a spectrum analyzer which analyzes spectrum components of each of said frame signals to obtain corresponding spectrum information;

a noise spectrum estimator which estimates a respective noise spectrum for each of said frame signals;

a spectrum subtractor which subtracts a product spectrum from the spectrum information of each respective frame signal to obtain a respective subtracted spectrum information for each frame signal, wherein the product spectrum is obtained by multiplying each respective estimated noise spectrum by a predetermined coefficient;

an evaluator which evaluates whether said coefficient is adequate by analyzing each respective subtracted spectrum information outputted from said spectrum subtractor;

a coefficient modifier which modifies a value of said coefficient on the basis of an evaluation result by said evaluator;

a controller which controls the processes in said spectrum subtractor, said evaluator, and said coefficient modifier so as to repeat said processes until the evaluation result by said evaluator fulfills a predetermined condition; and a time-domain signal converter which converts each subtracted spectrum information into a time-domain signal.

16. The noise suppression apparatus according to claim 11, wherein said evaluator counts a respective number of frequency components having negative amplitudes in the spectrum information corresponding to each of said frame signals and compares the counted values to a predetermined value, and wherein said coefficient modifier decreases a value of the coefficient when said evaluator evaluates that a respective counted number is equal to or more than said predetermined value.

17. The noise suppression apparatus according to claim 11, wherein said evaluator extracts a respective frequency component having a respective minimum amplitude value from the spectrum information corresponding to each of said frame signals, and compares each extracted amplitude value to a predetermined value, wherein said coefficient modifier decreases a value of the coefficient when said evaluator evaluates that said respective amplitude value is equal to or less than said predetermined value.

18. A recording medium which contains a processing program for removing noise removal from an input voice signal which is divided into a plurality of successive frame signals, each frame signal having a predetermined length, the processing program being readable by a computer to execute the steps of:

identifying each frame signal as either a voice frame signal or a non-voice frame signal;

analyzing spectrum components of each frame signal to obtain corresponding spectrum information;

estimating a respective noise spectrum for each of said frame signals;

multiplying each estimated noise spectrum by a predetermined coefficient to obtain a respective product spectrum corresponding to each of said frame signals;

subtracting the respective product spectrum from the corresponding spectrum information of each of said frame signals to obtain a corresponding subtracted spectrum for each frame signal;

evaluating whether said coefficient is adequate by analyzing each corresponding subtracted spectrum;

modifying a value of said coefficient on the basis of the corresponding evaluation result when said corresponding evaluation result does not fulfil a predetermined condition, repeatedly executing said multiplying step, said subtracting step, said evaluating step, and said modifying step, until said corresponding evaluation result fulfills the predetermined condition; and converting the respective subtracted spectrum into a time-domain signal for each of said frame signals for which said corresponding evaluation result fulfills the predetermined condition.

19. The recording medium according to claim 14, wherein the processing program further causes a computer to execute the steps of:

counting a respective number of frequency components having negative amplitudes in each respective subtracted spectrum, wherein said evaluating step comprises comparing each respective counted number to a predetermined value; and wherein said modifying step comprises decreasing a value of the coefficient when an evaluation result is such that said respective counted number is equal to or less than said predetermined value.

20. The recording medium according to claim 14, wherein the processing program further causes a computer to execute the steps of:

extracting a respective frequency component having a minimum amplitude value from each respective subtracted spectrum, wherein said evaluating step comprises comparing the amplitude value of a respective extracted frequency component to a predetermined value; and wherein said modifying step comprises decreasing a value of the coefficient when the respective evaluation result is such that the corresponding amplitude value is equal to or less than said predetermined value.

21. A noise suppression apparatus for removing noise from an input voice signal which is divided into a plurality of successive frame signals, each frame signal having a predetermined length, said apparatus comprising:

a voice signal discriminator which identifies each frame signal as either a voice frame signal or a non-voice frame signal;

a spectrum analyzer which analyzes spectrum components of each of said frame signals to obtain corresponding spectrum information;

a noise spectrum estimator which estimates a respective noise spectrum for each of said frame signals using the respective spectrum information of each frame signal and a spectrum information corresponding to a prior non-voice frame signal if a current frame signal is a non-voice frame signal, or using spectrum information of a predetermined number of randomly selected prior non-voice frame signals if said current frame signal is a voice frame signal;

a spectrum subtractor which subtracts a spectrum which is a function of a respective noise spectrum from the respective spectrum information of each frame signal; and a time-domain signal converter which converts each output of said spectrum subtractor into a respective time-domain signal.

22. A noise suppression apparatus for removing noise from an input voice signal which is divided into a plurality of successive frame signals, each frame signal having a predetermined length, said apparatus comprising:

a voice discriminator which identifies each frame signal as either a voice frame signal or a non-voice frame signal;

a spectrum analyzer which analyzes spectrum components of each of said frame signals to obtain corresponding spectrum information;

a noise spectrum estimator which estimates a respective noise spectrum for each of said frame signals by calculating an average value between the respective spectrum information of a current frame signal and spectrum information of a predetermined number of prior non-voice frame signals if said current frame signal is a non-voice frame signal, or by calculating an average value between spectrum information of a predetermined number of randomly selected prior non-voice frame signals if said current frame signal is a voice frame signal;

a spectrum subtractor which subtracts a spectrum which is a function of a respective noise spectrum from the respective spectrum information of each frame signal; and a time-domain signal converter for converting spectrum information which converts each output signal of said spectrum subtractor into a corresponding time-domain signal.

23. A recording medium which contains a processing program for removing noise from an input voice signal which is divided into a plurality of successive frame signals, each frame signal having a predetermined length, the processing program being readable by a computer to execute the steps of:

identifying each frame signal as either a voice frame signal or a non-voice frame signal;

analyzing respective spectrum components of each of said frame signals to obtain corresponding spectrum information;

estimating a respective noise spectrum for each of said frame signals using the respective spectrum information of a current frame signal and spectrum information of a prior non-voice frame signal if said current frame signal is a non-voice frame signal, or using spectrum information of a predetermined number of randomly selected prior non-voice frame signals if the current frame signal is a voice frame signal;

subtracting a spectrum which is a function of the respective noise spectrum from the corresponding spectrum information of each frame signal to obtain corresponding output signals; and converting spectrum each output signal into a corresponding time-domain signal.

24. A noise suppression apparatus for removing noise from an input voice signal which is divided into a plurality of successive frame signals, each frame signal having a predetermined length, said apparatus comprising:

a voice discriminator which identifies each frame signal as being either a voice frame signal or a non-voice frame signal;

a spectrum analyzer which analyzes spectrum components of each of said frame signals to obtain corresponding spectrum information;

a spectrum memory that can save spectrum information corresponding to a plurality of non-voice frame signals;

a spectrum recorder which records spectrum information of a current frame signal in said spectrum memory if said current frame signal is a non-voice frame signal;

an estimated noise spectrum calculator which estimates a respective noise spectrum for each of said frame signals using the respective spectrum information of the current frame signal and spectrum information of a prior non-voice frame signal saved in said spectrum memory if said frame signal is a non-voice frame signal, or using spectrum information corresponding to a predetermined number of prior non-voice frame signals that are selected at random from the spectrum information saved in said spectrum memory if said frame signal is a voice frame signal;

a spectrum subtractor which subtracts a spectrum which is a function of a respective noise spectrum from the corresponding spectrum information of each frame signal to obtain corresponding output signals; and a time-domain signal which converts each output signal into a corresponding time-domain signal.

25. A noise suppression apparatus for removing noise from an input voice signal which is divided into a plurality of successive frame signals, each frame signal having a predetermined length, said apparatus comprising:

a voice discriminator which identifies each frame signal as either a voice frame signal or a non-voice frame signal;

a spectrum analyzer which analyzes spectrum components of each of said frame signals to obtain corresponding spectrum information;

a spectrum memory that can save spectrum information corresponding to a plurality of non-voice frame signals;

a spectrum recorder which records spectrum information of a current frame signal in said spectrum memory if said current frame signal is a non-voice frame signal;

an estimated noise spectrum calculator which estimates a respective noise spectrum for each of said frame signals by calculating an average value between the respective spectrum information of the current frame signal and a spectrum information saved in said spectrum memory corresponding to a predetermined number of prior non-voice frame signals if said current frame signal is a non-voice frame signal or by calculating an average value between spectrum information corresponding to a predetermined number of prior non-voice frame signals that are selected at random from spectrum information saved in said spectrum memory if said current frame signal is a voice frame signal;

a spectrum subtractor which subtracts a spectrum which is a function of a respective noise spectrum from the corresponding spectrum information of each frame signal to obtain respective output signals; and a time-domain signal converter for converting spectrum information which converts each output signal into a corresponding time-domain signal.

26. A recording medium which contains a processing program for removing noise removal from an input voice signal, wherein the processing program is readable by a computer to execute the steps of:

identifying each frame signal as being either a voice frame signal or a non-voice frame signal;

analyzing spectrum components of each of said frame signals to obtain corresponding spectrum information;

estimating a respective noise spectrum for each of said frame signals by calculating an average value between the respective spectrum information of a current frame signal and spectrum information corresponding to a predetermined number of prior non-voice frame signals if said current frame signal is a non-voice frame signal, or by calculating an average value between spectrum information corresponding to a predetermined number of randomly selected prior non-voice frame signals if said current frame signal is a voice frame signal;

subtracting a spectrum which is a function of a respective noise spectrum from the respective spectrum information of each frame signal to obtain respective output signals; and converting each output signal into a corresponding time-domain signal.

27. A noise suppression apparatus for removing noise from an input voice signal which is divided into a plurality of successive frame signals, each frame signal having a predetermined length, said apparatus comprising:

a voice signal discriminator which identifies each frame signal as either a voice frame signal or a non-voice frame signal;

a spectrum analyzer which converts each of said frame signals into a respective frequency-domain signal;

a noise spectrum estimator which estimates a noise spectrum in each frame signal which has been identified as being a non-voice frame signal by said voice discriminator;

a spectrum subtractor which subtracts a spectrum which is a function of a noise spectrum estimated by said noise spectrum from each frequency-domain signal obtained by said spectrum analyzer;

a spectrum adder which adds a spectrum to cause a masking effect in each output signal of said spectrum subtractor; and a time-domain signal converter which converts each output signal of said spectrum adder into a time-domain signal.

* * * * *